Aug. 8, 1950 A. H. DICKINSON 2,517,986

COMMUTATOR

Filed March 1, 1946 2 Sheets-Sheet 1

INVENTOR
A. H. DICKINSON

BY [signature]
ATTORNEY

INVENTOR
A.H.DICKINSON
BY
W. M. Wilson
ATTORNEY

Patented Aug. 8, 1950

2,517,986

UNITED STATES PATENT OFFICE 2,517,986

COMMUTATOR

Arthur H. Dickinson, Greenwich, Conn., assignor to International Business Machines Corporation, New York, N. Y., a corporation of New York Application March 1, 1946, Serial No. 651,180

10 Claims. (Cl. 250—27)

This invention relates to electronic trigger circuits and to a commutator based on such circuits.

The trigger circuit has two impedance networks including variable impedance means and so retroactively coupled that opposite electrical conditions exist in the two impedances when the circuit is in a stable status. The conditions in the two networks are reversible upon an unbalancing of the circuit in favor of such reversal. In a common form of the trigger circuit, the variable impedance means comprises a vacuum tube in each network, with the anode of each tube being retroactively coupled to a control grid of the other tube. In a stable status of the circuit, one tube will be at low impedance and, through the retroactive coupling, will sustain the other tube at high impedance. An electrical effect, such as produced by a pulse, may be applied to the circuit to reverse the impedance conditions of the two tubes and thereby produce a reversal in status of the circuit. It is appreciated that in said circuit, a pulse applied to either tube will affect the stability of the circuit.

It is an object of the invention to provide an improved electronic trigger circuit which may receive and pass through a pulse or electrical effect, without involving a change in stability or in status of the circuit.

Further, it is an object of the invention to provide an improved electronic trigger circuit which may function continually as a pulse gate while the circuit remains in a sustained stable status.

Still further, an object is to provide an electronic trigger circuit which includes a plurality of pulse gates selectively effective according to the status of the circuit.

An object of the invention is to provide an improved trigger circuit in which at least one of the two networks has an electron tube a portion of which may serve in retroactive coupling relation to the other network and another portion of which may serve as a pulse gate.

An object of the invention is to provide a trigger circuit in which at least one of the two networks has a vacuum tube with a plurality of collector electrodes, one of which is usable for the retroactive coupling to the other network and the other of which is free to serve other purposes having no effect on the status of the circuit.

More specifically, an object of the invention is to provide a trigger circuit in which at least one of the two networks includes a multi-grid vacuum tube, with one of the grids serving as a control electrode and another serving for the retroactive coupling to the other network, and with the andoe free to serve other purposes.

An object of the invention is to provide a trigger circuit in which at least one of the two opposing networks includes a vacuum tube affording one current path which has high or low current flow sustained by the other network in accordance with whether the circuit is in one stable status or an alternative stable status, with the vacuum tube also having another current path which is selectively rendered effective, in accordance with the condition of the other current path, to respond to applied electrical changes and without affecting the status of the circuit.

More specifically, an object of the invention is to provide a trigger circuit including in one of its two opposing networks a multi-grid vacuum tubes affording a grid-cathode path which is retroactively coupled to the other network and in which the anode-cathode path may be utilized as a pulse gate which is open or closed depending on the status of the circuit.

Further, an object of the invention is to provide a trigger circuit including in one of its two impedance networks a multi-electrode tube having a control electrode, another electrode retroactively coupled to the other network, a third electrode for receiving pulses, and a fourth electrode for responding to these pulses selectively according to whether the circuit is one sustained, stable status or in its alternate status.

It is also one of the principal objects of the invention to provide an electronic commutator based on trigger circuits such as referred to in the previous objects.

Specifically, an object is to provide a commutator based on trigger circuits which function as pulse gates for selectively passing pulses from a common pulse source and in such manner as to control sequential operation of the circuits.

It is also an obqect of the invention to provide a ring of electronic trigger circuits operable sequentially to one status and then sequentially to an alternate status and which may so function in different directions or sequences.

An object of the invention is to provide a series of trigger circuits so coupled as to operate selectively in different sequences and under control of a single series of pulses.

An object of the invention is to provide a series of trigger circuits triggerable to alternative electrical states is response to similarly phased pulses and so triggerable in different sequences under control of a sequence selecting circuit.

An object of the invention is to provide a series of trigger circuits and interrelating means to selectively produce pulses for operating the series of circuits in different directions.

An object of the invention is to provide a series of trigger circuits and interrelating means for producing pulses under control of the trigger circuits to operate the series of circuits in selectively different sequences.

An object of the invention is to provide a series of trigger circuits and means controlled thereby and by a direction control means for selectively producing pulses to operate the series of circuits in selectively different directions.

An object of the invention is to provide a ring of trigger circuits determining the production of pulses to operate the ring in a chosen one of different possible directions.

Other objects of the invention will be pointed out in the following description and claims and illustrated in the accompanying drawings, which disclose, by way of examples, the principle of the invention and the best mode, which has been contemplated, of applying that principle.

Figure 1:
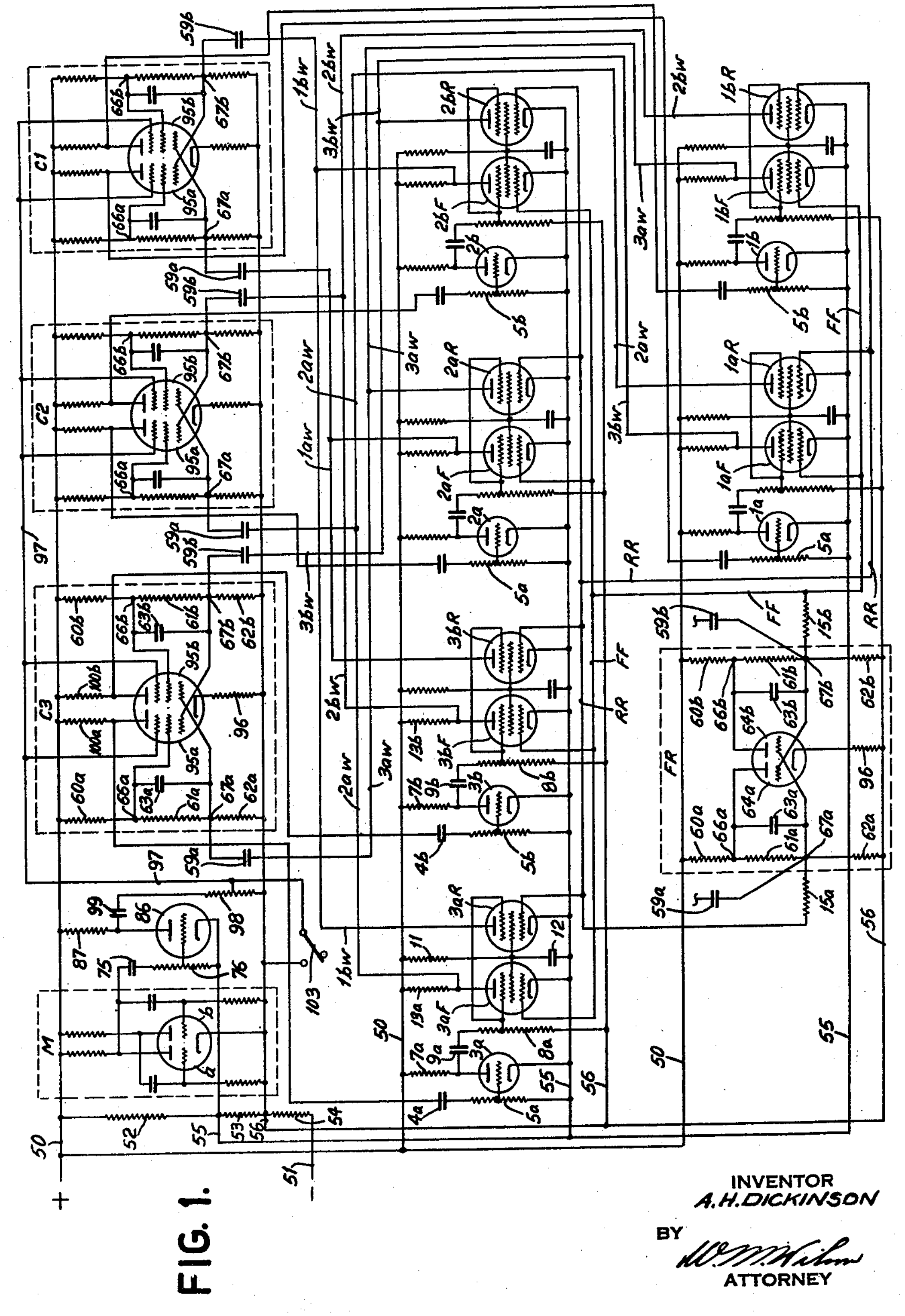
Fig. 1 is a circuit diagram showing an exemplification of the invention.

Referring to Fig. 1, the plus line 50 and minus line 51 connect through a switch (not shown) to a suitable D. C. source. Resistors 52, 53, and 54 form a voltage divider across lines 50 and 51. The voltage divider is tapped by lines 55 and 56 of which the line 55 is positive to line 56.

Figure 2:
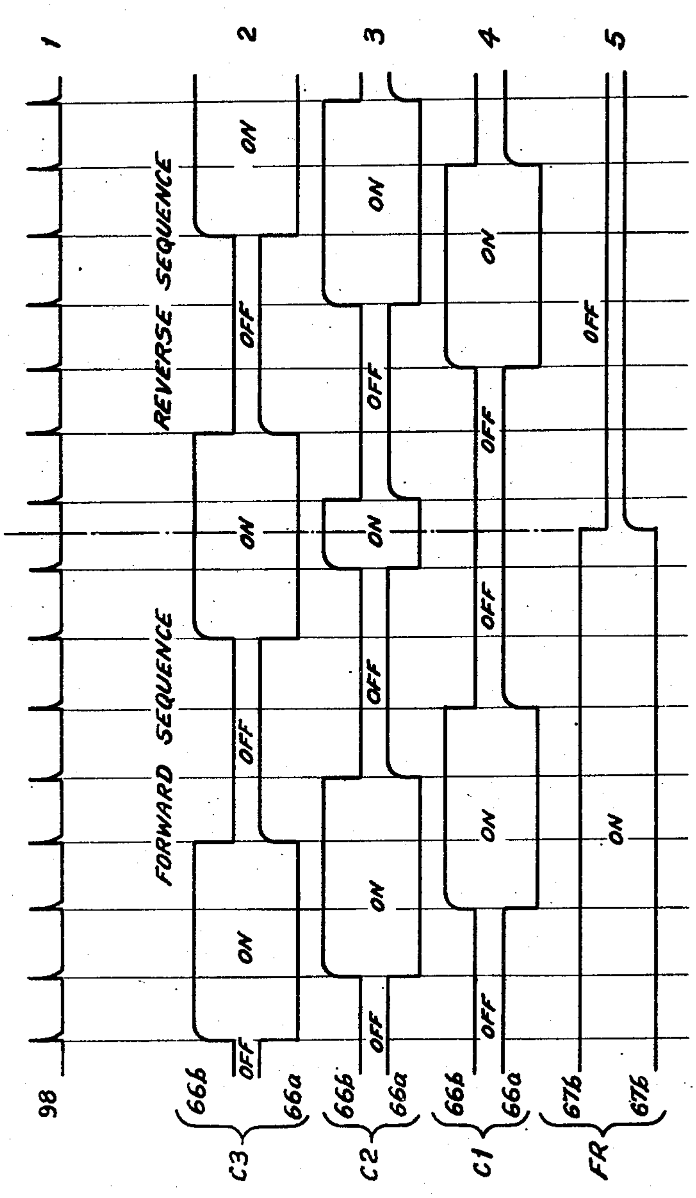
Fig. 2 is a chart of pulses and potentials at different portions of the circuits.

Pulses are required to operate the electronic commutator. The primary pulse generator is a conventional multivibrator oscillator designated M in Fig. 1. As is known, the multivibrator develops square pulses alternately on the outputs of its two tubes *a* and *b*. Only those on the output of tube *a* are used here. The output of tube *a* is coupled by a condenser 75 and resistor 76 to line 55. The condenser and resistor have an R. C. product sufficiently small to differentiate the square pulses on the output of tube *a* into positive and negative pulses of extremely short duration and steep wave front. Resistor 76 is tapped by the grid of a triode 86. The triode has its anode connected by a resistor 87 to line 50 and its cathode connected to line 55. The output of the triode is coupled to line 56 by a condenser 99 and resistor 98. Since the resistor 76 and the cathode of triode 86 both terminate at line 55, the normal bias of the triode is zero, under which condition it is quite conductive. Hence, of the positive and negative pulses received from resistor 76 by the grid of triode 86, the positive pulses are substantially quenched, while the negative pulses are converted to amplified positive pulses upon the resistor 98. These positive pulses are fairly sharp and of steep wave front, as indicated in Fig. 2, line 1, and are applied to the commutator to control its operation.

The commutator has a number of stages dependent on the number of steps it is to perform in a cycle. As illustrated, three stages are shown and designated C1, C2, and C3. Each stage is alike and comprises a novel type of trigger circuit. This trigger circuit has two parallel and symmetrical impedance networks or branches. The left hand branch includes resistors 60*a*, 61*a*, and 62*a*, in series between lines 50 and 56, and a condenser 63*a* shunting resistor 61*a*. The right hand branch includes a similar arrangement of resistors 60*b*, 61*b*, and 62*b* and condenser 63*b*. A pair of pentodes 95*a* and 95*b* are connected, with their anode-cathode circuit paths in parallel, between lines 50 and 56. Simply for convenience, the pentodes are shown as sections of a duplex tube having a common cathode. The anodes of 95*a* and 95*b* connect via resistors 100*a* and 100*b*, respectively, to line 50, and the common cathode connects to line 56 through a resistor 96. It may be mentioned now that the resistor 96 is of such value that when either 95*a* or 95*b* is conductive, the potential drop across the resistor 96 is substantially equal to the maximum potential drop which will occur across resistor 62*a* or 62*b*. The screen grid of 95*a* is connected to the junction 66*a* of resistors 60*a* and 61*a*, while the screen grid of 95*b* is connected to the junction 66*b* of resistors 60*b* and 61*b*. The control grid of 95*a* is connected to the junction 67*b* of resistors 61*b* and 62*b*, while the control grid of 95*b* is connected to junction point 67*a* of resistors 61*a* and 62*a*. The suppressor grids of the pentodes 95*a* and 95*b* of all of the trigger circuits C1, C2, and C3 are connected to the common wire 97 which taps the resistor 98 upon which the positive pulses (Fig. 2, line 1) are continually produced in the manner explained before.

The similarly numbered parts of the tube branches of each trigger circuit have equal values. In practice, it has been found suitable to use resistors 60*a*, 62*a*, 60*b*, and 62*b* each of which has about one-third the resistance of each of the resistors 61*a* and 61*b*. Condensers 63*a* and 63*b* each have a capacity in the order of a few micromicrofarads.

It will be noted that the screen-cathode path of the pentode 95*a* is in shunt with the resistors 61*a* and 62*a* and, therefore, may be considered as a portion of the left hand impedance branch of the trigger circuit. Similarly, the screen-cathode path of 95*b* may be considered a portion of the right hand impedance branch. It will be noted, further, that the two impedance branches of the trigger circuit are cross-coupled since point 67*a* of the left hand branch connects to the control grid of tube 95*b* while point 67*b* of the right hand branch is connected to the control grid of tube 95*a*. In other words, the retroactive coupling required between the two halves of the trigger circuit is here obtained by retroactively coupling the screen-cathode current path of the tube in one half the circuit to the control grid of the tube in the opposite half of the circuit.

The trigger circuit described above has two, alternative states of stability. In one state, which may be called the off state, pentode 95*b* is at substantially zero control grid bias and has relatively large screen-cathode current flow while the control grid bias of pentode 95*a* is negative and its screen-cathode path is at cut-off. Also, in the off state, points 66*a* and 67*a* are at high potentials while points 66*b* and 67*b* are at low potentials. In the alternative state, which may be called the on state, the electrical conditions are reversed. The circuit is self-sustaining in either of its two alternative states until it is driven to the reverse state by a tripping pulse.

As stated above, in the off state of the trigger circuit, the control grid of tube 95*b* is substantially at zero bias, under which condition there is appreciable current flow through the screen-cathode path of 95*b*. With the resistor 60*b* properly chosen, the impedance of this screen-cathode path now is quite low compared to that of the resistor. Accordingly, the screen of 95b is not much higher in potential than the cathode, and the point 66b, to which the screen is connected, is at low potential. With resistors 61b and 62b suitably chosen, the potential drop across 61b renders the point 67b substantially negative with respect to cathode potential. Since the control grid of 95a is connected to point 67b, it is also negative with respect to the cathode and sufficiently so to block screen-cathode current in 95a. In other words, the screen-cathode path of 95a is at cut-off, and its impedance is high compared to that of resistor 60a. Hence, the screen of 95a and the point 66a connected to it are at high potential such that the potential drop across resistor 61a does not force point 67a below cathode potential. As the control grid of 95b is connected to point 67a, the control grid bias of 95b is then substantially zero, thus sustaining the screen grid cathode path of 95b at low impedance.

In the foregoing manner, the trigger circuit when in off state has a distribution of potential such as to sustain the circuit in this state. Similarly, since the branches are symmetrical, the circuit is self-sustaining in its on state in which pentode 95a is at substantially zero control grid bias and has relatively large screen-cathode current flow, and in which points 66a and 67a are at low potentials, while pentode 95b is at negative control grid bias, its screen-cathode path is at cut-off, and points 66b and 67b are at high potentials.

The trigger circuit may be reversed in status in response to a tripping pulse applied to a suitable point. Thus, it is reversible from off to on state either in response to a negative pulse applied to point 67a or a positive pulse applied to point 67b. It is reversible from on to off state in response to a negative pulse applied to point 67b or a positive pulse applied to point 67a. In the present case, negative tripping pulses will be used. The means for producing the tripping pulses will be described later. For the present, it is sufficient to state that a negative pulse is applied via a condenser 59a to point 67a in order to trip the circuit from off to on state and a negative pulse is applied via a condenser 59b to trip the circuti from on to off status. Assume, for instance, that a trigger circuit is in off status and a negative pulse is applied via condenser 59a to point 67a. This pulse reduces the potential difference across resistor 62a. In other words, the potential of point 67a, and the connected control grid of 95b, drops from its previous approximate cathode level to a negative value with respect to the cathode. Consequently, current flow through the screen-cathode path of 95b decreases, there is a diminished voltage drop across resistor 60b, and point 66b suddenly rises in potential. The positive pulse thereby produced at point 66b is transferred by condenser 63b to the control grid of 95a, effecting a sudden reduction of its previously negative bias. Accordingly, the current flow in the screen-cathode path of 95a increases, there is a larger voltage drop across the resistor 60a, and point 66a decreases suddenly in potential. The negative pulse thereby produced at point 66a is transferred by condenser 63a to the control grid of 95b, promoting its increase in negative bias and the consequent reduction in its screen-cathode current flow. The interaction between the two branches of the trigger circuit continues until ultimately the screen-cathode path of 95b is at cut-off while that of 95a has appreciable current flow. In short, the trigger circuit has been tripped from off to on state in which points 66a and 67a are at low potentials and points 66b and 67b at high potentials and in which pentode 95a is at substantially zero control grid bias and its screen-cathode path at low impedance, while pentode 95b is at negative control grid bias and its screen-cathode path is at cut-off. In a similar manner, the trigger circuit when in on state may be tripped to off state in response to a negative pulse applied via condenser 59b to point 67b. For effective tripping action, the tripping pulses applied at points 67a and 67b should be substantially steep and shorter in duration than the pulses fed through condensers 63a and 63b after tripping action has been initiated.

It is characteristic of a pentode that if its suppressor is sufficiently negative to the cathode, it blocks anode-cathode current flow regardless of the control grid potential, but if the suppressor is at substantially cathode potential, the current flow in the anode-cathode path is determined by the control grid bias. As mentioned before, the suppressors of pentodes 95a and 95b are connected to wire 97 which taps the resistor 98 upon which positive pulses (Fig. 2, line I) are continually produced. The resistor 98 terminates at line 56 which is substantially negative to the cathodes of the pentodes 95a and 95b. The suppressors of these pentodes are thereby normally sufficiently negative to the cathodes to block their anode-cathode paths, regardless of their control grid potentials. But upon the appearance of a positive pulse on the resistor 98 and its transmission by wire 97 to the suppressors of the pentodes, the potential of the suppressors is increased above blocking potential. Thereupon, that pentode which is also at substantially zero control grid bias becomes conductive in its anode-cathode path and develops a negative pulse upon its anode. Such negative pulses will be continually developed by this pentode as long as it remains at substantially zero control grid bias and as long as wire 97 is being positively pulsed.

As explained previously, when the trigger circuit is in off state, pentode 95b is at substantially zero control grid bias while pentode 95a is at negative control grid bias. Accordingly, in the off state of the trigger circuit, only the pentode 95b is conditioned to respond to variations in suppressor potential. Thus, upon the concurrent application of a positive pulse, from wire 97, to both pentodes of the trigger circuit, only pentode 95b will produce a negative pulse upon its anode, while the negative control grid bias of 95a will maintain its anode-cathode path blocked. On the other hand, when the trigger circuit is in on state, pentode 95b is at negative control grid bias while pentode 95a is at zero control grid bias, so that only 95a will develop a negative pulse upon its anode in response to the positive pulse transmitted by wire 97 to its suppressor.

The foregoing has described a novel electronic trigger circuit in which the retroactive and status-sustaining coupling between the mutually balancing impedance networks is provided between an auxiliary collector electrode, the screen, of the pentode in each network and a control electrode, the control grid, of the pentode in the other network. Further, it has been pointed out that this manner and means of retroactively coupling the networks leaves the anode-cathode path free to serve as a pulse gate to invert and pass pulses applied to another electrode, the suppressor, without affecting the status of the circuit. It has also been shown that whether an anode-cathode path is conditioned to serve as a pulse gate depends on the status of the circuit, and particularly on the control grid bias which has alternative values related to the status of the circuit. Since the circuit has two alternative states of stability, it has two alternatively effective pulse gates which can function without affecting the stability or status of the circuit. It is apparent that the pentode 95*a* or 95*b* could invert positive to negative pulses or negative to positive pulses, depending on whether the suppressor was normally at negative, blocking potential or normally at substantially cathode potential. In the present application, the wire 97 is normally negative to the cathode and applies positive pulses to the suppressor. Hence, in this case, the pentodes of the trigger circuits will serve to invert positive to negative pulses. These negative pulses act through interrelating means for the trigger circuits C3, C2, and C1, comprising the stages of the commutator, to control sequential operation of the commutator stages in either of opposite directions or sequences. For convenience, one direction may be called the forward direction and the other the reverse direction. The forward direction is considered here, for reference purposes, as the one in which stages C3, C2, and C1 operate sequentially, and the reverse direction as the one in which stages C1, C2, and C3 operate sequentially. The interrelating means has a set of elements which function for the forward sequence and another set of elements which function for the reverse sequence. These sets of elements are selectively conditioned to function by a direction control circuit. This circuit is designated FR and is the common type of trigger circuit discussed at the beginning of this application. Briefly, its left hand branch includes resistors 60*a*, 61*a* and 62*a* and a condenser 63*a* shunting 61*a*. The symmetrical right hand branch includes resistors 60*b*, 61*b* and 62*b*, and a condenser 63*b* shunting 61*b*. These elements of trigger circuit FR are similar to the like-designated elements of trigger circuit C1, C2, or C3, for which reason they have been given the same reference characters. Circuit FR also includes a pair of triodes 64*a* and 64*b* shown, for simplicity, as sections of a duplex tube having a common cathode connected to line 56 by a resistor 96 which corresponds to the resistor 96 of circuit C1, C2, or C3. The anode of triode 64*a* connects to point 66*a*, so that the anode-cathode path of this triode is in shunt with resistors 61*a* and 62*a*. Triode 64*b* has its anode connected to point 66*b*, so that its anode-cathode path is in shunt with resistors 61*b* and 62*b*. The left and right hand impedance branches are retroactively coupled by tieing the grid of 64*a* of the left hand branch to the point 67*b* of the right hand branch, and the grid of 64*b* to the point 67*a* of the left hand branch. It will be noted that in this common type of trigger circuits, the retroactive and stability-sustaining coupling is between the anode-cathode path of the tube 64*a* or 64*b* and the control grid of the other tube. This trigger circuit also has alternative states of stability, here called the on and off states. The off state is considered the one in which triode 64*a* is cut-off and points 66*a* and 67*a* at high potentials, while triode 64*b* is at substantially zero bias and highly conductive and points 66*b* and 67*b* at low potentials. The on state of the trigger circuit has the reverse of these electrical conditions in the opposite branches. To trip this trigger circuit, pulses may be applied to points 67*a* and 67*b*. If the circuit is off, it may be tripped to on state by a positive pulse applied from a source (not shown) through a condenser 59*b* to point 67*b*. The circuit may be returned to off state by a positive pulse applied from a source (not shown) through a condenser 59*a* to point 67*a*.

Assume, for instance, that circuit FR is in off state and it is desired to trip it to the on state. A positive pulse is applied via condenser 59*b* to point 67*b* and the connected grid of triode 64*a*. This pulse reduces the negative bias of 64*a*, starting current flow therethrough, as a result of which the potential of point 66*a* drops suddenly. In consequence, a negative pulse is transferred by condenser 63*a* from point 66*a* to point 67*a* and the connected grid of 64*b*, reducing its conductivity. Point 66*b* thereupon rises suddenly in potential and condenser 63*b* transfers the attendant positive pulse to point 67*b* and the grid of 64*a*, promoting the conductivity of 64*a*. As a result, a negative pulse again appears at 66*a* and is transferred by 63*a* to the point 67*a* and the grid of 64*b*, promoting its decline in conductivity. These interactions between the branches continue until ultimately the triode 64*b* is at cut-off and the triode 64*a* is at a substantially zero bias. In short, the trigger circuit has been tripped from off to on state. In a similar manner, the trigger circuit may be switched back to off state under control of a positive pulse applied via condenser 59*a* to point 67*a*.

When trigger circuit FR is in off state, it brings into play the reverse sequence-functioning set of elements of the interrelating means for the commutator stages. When trigger circuit FR is in on state, it brings into play the forward sequence-functioning set of elements of the interrelating means. It may be mentioned now that elements pertaining to the forward sequence are identified by letter F in their designations, while elements pertaining to the reverse sequence are identified by letter R in their designations. As will be made clear, the interrelating means is under the joint control of the direction selecting circuit FR and of the commutator stages. The interrelating means will now be described.

The interrelating means comprises a plurality of electronic networks, each under control of one of the branches of each of the commutator stages. Since the illustrative commutator has three stages, composed of six branches, there are six electronic networks in the illustrated interrelating means. Each such network contains a triode and two pentodes. The tubes of the network controlled by the left hand branch of stage C3 are triode 3*a* and pentodes 3*a*F and 3*a*R. The tubes of the network controlled by the right hand branch of the stage C3 are triode 3*b* and pentodes 3*b*F and 3*b*R. The networks associated with stage C2 contain tubes 2*a*, 2*a*F and 2*a*R for the left hand branch and tubes 2*b*, 2*b*F and 2*b*R for the right hand branch. The tubes in the networks associated with stage C1 are identified by designations including number 1 and letter *a* for the left hand branch and letter *b* for the right hand branch.

The pentodes in each interrelating network are maintained at suitable potential by connecting their screens via resistor 11 and condenser 12 to lines 50 and 55, respectively. The control grids of the pentodes having letter F in their designations are connected to a common line FF which is coupled by a resistor 15*b* to the point 67b of the direction determining circuit FR. The control grids of those pentodes which have letter R in their designations are tied to a common line RR which is connected by a resistor 15a to point 67a of circuit FR. When FR is off, the point 67a is at substantially the potential of line 55. This is also the cathode potential of the pentodes in the interrelating circuits. Accordingly, with FR off, the control grids of the R pentodes are at substantially zero grid bias. On the other hand, when FR is on, its point 67b is at substantially the potential of the cathodes of the F pentodes and these are at substantially zero control grid bias. As is now understood, only those pentodes which are at substantially zero control grid bias will be responsive to a change in suppressor potential. The pentodes conditioned by zero control grid bias are the ones functioning during the selected commutator sequence. The R pentodes are thus conditioned by the off status of circuit FR to function for the reverse sequence, while the F pentodes are similarly conditioned by the on state of FR to function for the forward sequence.

The suppressors of the R and F pentodes in each network will be positively and concurrently pulsed under control of the associated commutator stage, but only that pentode conditioned by zero control grid bias will respond and develop a negative pulse upon its anode. This negative pulse will be applied to a following commutator stage to reverse its status. When the F pentodes are conditioned by circuit FR to function, the negative pulse developed by the F pentode of a network relating to one stage will be applied to the stage which follows in the forward direction. But when the R pentodes are conditoned to function, the R pentode of a network associated with a stage will be applied to the stage which follows in the reverse direction.

In further explanation, assume that the F pentodes are conditioned, by the on status of the circuit FR, to function, for the forward sequence. Assume, further, that the stage C3 is on while stages C2 and C1 are off. With C3 on, its pentode 95b is at cut-off control grid bias while its pentode 95a is at zero control grid bias. Accordingly, only pentode 95a of C3 is functioning, in response to the positive pulses applied by wire 97 to the suppressors of both pentodes, to develop negative pulses uon its anode. A negative pulse developed by pentode 95a (C3) is transmitted via a condenser 4a to a resistor 5a. The resistor 5a is tapped by the grid of triode 3a. Resistor 5a and the cathode of 3a both terminate at line 55, so that the grid bias of 3a is normally zero and 3a is quite conductive. But upon the transmission of a negative pulse to resistor 5a, the grid bias of 3a becomes negative, causing a sharp reduction in current flow through 3a and its load resistor 7a. The resulting positive pulse is transmitted from the anode of 3a, by way of condenser 9a, to a resistor 8a. This resistor is tapped by the parallel suppressors of pentodes 3aF and 3aR. Resistor 8a terminates at line 56 which is substantially negative to the cathodes of the pentodes 3aF and 3aR; hence, the suppressor bias of each of these pentodes is normally negative and effective to block anode-cathode current flow regardless of their grid bias. But upon the appearance of a positive pulse upon resistor 8a and its concurrent transmission to the suppressors of both pentodes, the pentode at zero control grid bias is rendered conductive upon the reduction in its negative suppressor grid bias. As it has been assumed that the pentode 3aF is at zero control grid bias, this pentode is the one now rendered conductive by the positive pulsing of its suppressor. Current flow occurs through the pentode 3aF, and its load resistor 13a, whereby a negative pulse is developed on its anode. This negative pulse is transmitted by a wide 2aw and condenser 59a to point 67a of stage C2. As explained before, the effect of a negative pulse applied to point 67a of the trigger circuit is to switch it from off to on status. Thus, stage C2 is now tripped to its on status.

In the foregoing manner, under the joint control of direction selecting circuit FR, in on state, and of the commutator stage C3, in on state, the stage C2, which follows C3 in the forward direction, was tripped on. This action was initiated by a pulse passed through the anode-cathode gate of pentode 95a (C3) and completed by a derived pulse passed by the forward sequence portion of the interrelating means between C3 and C2.

Now that C2 is on, its pentode 95a is conditioned to develop negative pulses on its anode in response to the positive pulsing of its suppressor. The first positive pulse transmitted from wire 97 to the suppressor of 95a after C2 has turned on brings about the switching of the next stage C1 to on status. Specifically, in response to a positive pulse applied to its suppressor, 95a (C2) produces, on its anode, a negative pulse which is transmitted to the resistor 5a in the network associated with the left hand branch of C2. The tube 2a inverts the negative pulse into a positive pulse which is applied concurrently to the suppressor grids of 2aF and 2aR. Since tube 2aF is now at zero control grid bias while tube 2aR is at cut-off control grid bias, the tube 2aF alone inverts the positive pulse into a negative pulse. This negative pulse is applied via a wire 1aw and condenser 59a to point 67a of stage C1, turning it on.

In the foregoing manner, under the joint control of circuit FR, in on state, and stage C2, in on state, the stage C1 which follows C2 in the forward direction, is switched on.

Stage C1, upon being tripped on, will control stage C3 to be turned off. The first positive pulse impressed upon the suppressor of 95a (C1) after C1 has been turned on will bring about the off switching of C3. Specifically, with C1 in on status, its pentode 95a is conditioned by zero control grid bias to invert the positive pulse upon its suppressor to a negative pulse upon its anode. This negative pulse is transmitted to the resistor 5a in the network associated with the left hand branch of C1. Tube 1a in this network inverts the negative pulse received from this resistor 5a into a positive pulse which is impressed upon the suppressors of 1aF and 1aR. Since 1aF is at zero control grid bias, it inverts the positive pulse received by its suppressor into a negative pulse upon its anode. This negative pulse is transferred by a wire 3bw and condenser 59b to the point 67b of stage C3, turning it off.

In the foregoing manner, under the joint control of the ciruict FR, in on state, and of the stage C1, when turned on, a tripping pulse is produced for turning off C3. In other words, C1 which is the last stage in the forward sequence controls C3 which is the first stage in the forward sequence in such manner that after the last stage is turned on, the first stage is turned off.

Now that C3 is off, its pentode 95b is at zero grid bias and effective to invert the positive pulses received from wire 97 by its suppressor into negative pulses. Such negative pulse is transmitted to the resistor 5b in the network associated with the right hand branch of C3. Tube 3b in this network inverts the negative pulse to a positive pulse which is applied via condenser 9b and a portion of resistor 8b to the suppressors of pentodes 3bF and 3bR. Since only 3bF is at zero control grid bias, it alone is effective to invert the positive pulse applied to its suppressor into a negative pulse. This negative pulse is transmitted via wire 2bw and a condenser 59b to point 67b of C2, turning it off.

In the foregoing manner, the first pulse received from wire 97 by C3 after being turned off brings about a chain of events for turning off C2.

Now that C2 is off, its tube 95b is effective to invert positive pulses from wire 97 to negative pulses. Such negative pulse is transmitted to the resistor 5b associated with the right hand branch of C2. Tube 2b in this network inverts the negative pulse to a positive pulse which is applied simultaneously to the suppressors of 2bF and 2bR. Only 2bF has been conditioned to zero control grid bias and, therefore, is effective to invert the positive pulse on its suppressor into a negative pulse. This negative pulse is fed by a wire 1bw and a condenser 59b to point 67b of C1, turning off C1.

In the foregoing manner, the first positive pulse received from wire 97 by stage C2 after it has been turned off brings about a chain of events for turning off C1.

With C1 off, its tube 95b inverts a positive pulse from wire 97 into a negative pulse which is transmitted to resistor 5b of the network associated with the right hand branch of C1. Tube 1b in this network inverts the negative pulse into a positive pulse. This positive pulse is applied to the suppressors of 1bF and 1bR. With 1bF conditioned at zero control grid bias, it inverts the positive pulse upon its suppressor into a negative pulse. The negative pulse is transmitted by a wire 3aw and condenser 59a to the point 67a of the stage C3, turning it on again, thus starting a new cycle.

In the foregoing manner, the last stage C3 in the forward sequence, after being turned off, brings about the on switching of the first stage C1 in the forward sequence.

Operation of the commutator may be suspended by adjusting a switch 103 from the position shown to its other position in which it connects wire 97 to line 56. With wire 97 switched to line 56, it stays at negative potential with respect to the cathodes of pentodes 95a and 95b of the commutator stages. The suppressors of these pentodes do not receive positive pulses, since wire 97 is not being pulsed, and the commutator stages, therefore, stay in the status which they had at the time the wire 97 has switched to line 55. Upon returning the switch 103 to the position shown, commutator operation resumes from the phase at which it was suspended.

The forward sequence of the commutator will be summarized with reference to Fig. 2, as well as to Fig. 1. Fig. 2 shows in parts 2, 3, and 4 the graphs of potential produced at points 66a and 66b of the commutator stages during commutator operation. Fig. 2, part 5, shows the potentials at points 67a and 67b of the direction controlling circuit FR. It is assumed that all the stages are initially off and that FR is in on status in which its point 67b is at higher potential than its point 67a. With FR on, it selects the forward sequence by conditioning all the F pentodes in the interrelating circuits to zero grid bias. To start operations, the operator adjusts switch 103 to the position shown in Fig. 1. Positive pulses of the character shown in Fig. 2, line 1 now appear upon line 97.

With all the stages initially off, their pentodes 95b are conditioned to respond to the pulses from line 97. As may be understood from the previous explanation, the pulses passed by pentode 95b of C3 tend to turn off C2 and those produced by 95b of C2 tend to turn off C1. Since C2 and C1 are initially off, they are not affected at this time. But 95b of C1 responds to the first pulse on line 97, after the adjustment of switch 103 to shown position, to cause C3 to be turned on. In other words, the right hand branch of the last stage C1 in the forward sequence, when in low impedance condition, acts through coupling means to switch the right hand branch of the first stage C3, in forward sequence, to a high impedance condition and to switch the left hand branch of C3 to low impedance condition. The left hand branch of C3, being in low impedance condition, responds to the next pulse from line 97 to cause the left hand branch of C2 to be switched to low impedance condition and the right hand branch to high impedance condition. In short, C2 has been turned on. Now, its left hand branch responds to the following pulse from line 97 and causes the left hand branch of C1 to be switched to low impedance condition and the right hand branch to be switched to high impedance condition; that is, C1 is switched on. One half a commutator cycle has been completed during which the stages C3, C2, and C1 have been turned on sequentially. To put it in terms of the impedance branches, during the half-cycle, the left hand branches of the stages have been successively switched to low impedance condition while their right hand branches have been switched to high impedance condition. The left hand branch of each stage except the last upon being switched to low impedance condition has controlled the left hand branch of the next stage in the forward sequence to be switched to low impedance condition and the right hand branch to be switched concurrently to high impedance condition. As for the last stage in the forward sequence, its right hand branch which was initially in low impedance condition has controlled the left hand branch of the first stage in this sequence to be switched to low impedance condition. At the end of the half-cycle, all the stages C3, C2, and C1 are on, as explained.

With all the stages on, their left hand branches are conditioned to produce pulses. Such pulse produced by the left hand branch of C3 merely tends to confirm the on state of C2, and the pulse produced by C2 merely confirms the on state of C1. But as to the left hand branch of C1, the pulse produced thereby in response to a pulse from line 97 acts through the associated coupling means to switch the stage C3 to off status, as previously explained. In other words, the left hand branch of C1, when in low impedance state, brings about the switching of the right hand branch of C3 to low impedance condition. The right hand branch of C3 then responds to a following pulse from line 97 to switch the right hand branch of C2 to low impedance condition; i. e., to turn off C2. In response to a following pulse from line 97, the right hand branch of C2 controls the switching of the right hand branch of C1 to low impedance condition; i. e., to turn off C1. This completes the second half of the cycle. During this second half, the stages C3, C2, and C1 have turned off successively. In terms of branches, the right hand branch of each stage except the last when switched to low impedance condition controls the switching of the right hand branch of the stage following in the forward direction to the same, low impedance condition. But, as to the last stage C1, its left hand branch in low impedance condition has controlled the switching of the right hand branch of the first stage C3 to low impedance condition.

The foregoing has described the forward sequence of a closed ring of commutator stages. The reverse sequence will now be explained.

To bring about the reverse sequence, the control circuit FR is adjusted to off status. Its point 67a rises in potential while its point 67b drops in potential, as indicated in Fig. 2, line 5. Consequently, the R pentodes in the interrelating networks are conditioned to produce pulses, while the F pentodes are disabled as far as their pulse producing function is concerned. Assuming that FR is turned off at the time indicated in Fig. 2 by the dot and dash lines, it is seen that the stages C3 and C2 are then in on status while stage C1 is in off status.

With C1 in off status, its pentode 95b, in the right hand branch, inverts a positive pulse from line 97 to a negative pulse. The negative pulse is transmitted to resistor 5b of the associated interrelating network. Tube 1b in this network inverts the negative pulse to a positive pulse which is applied to the suppressors of 1bF and 1bR. Only 1bR responds and produces a negative pulse which is transmitted by wire 2bw and a condenser 59b to point 67b of C2, turning off C2.

C2 being off, its pentode 95b in the right hand branch, responds to a pulse from wire 97 and transmits a negative pulse to the resistor 5b in the associated network. Tube 2b in this network inverts the negative pulse to a positive pulse applied to the suppressors of 2bF and 2bR. Only 2bR responds and produces a negative pulse which is transferred by wire 3bw and a condenser 59b to point 67b of stage C3, turning off this stage.

With C3 off, its pentode 95b, in the right hand branch, inverts a positive pulse from wire 97 to a negative pulse. This pulse is applied to resistor 5b in the related network. Tube 3b in this network inverts the negative pulse to a positive pulse which is impressed upon the suppressors of 3bF and 3bR. Only 3bR responds and produces a negative pulse which is transmitted by wire 1aw and a condenser 59a to the point 67a of C1, turning it on.

It is seen, then, that each of the stages except the last in the reverse sequence when turned off has controlled the following stage in this sequence to be turned off, but the last stage C3 in the reverse sequence, when turned off, has controlled the first stage C1 in this sequence to be turned on.

With C1 on, its pentode 95a, in the left hand branch, produces a negative pulse in response to a positive pulse from line 97. The negative pulse is transmitted to the resistor 5a of the related coupling network. Tube 1a inverts the negative pulse to a positive pulse which is applied to the suppressors of 1aF and 1aR. Only 1aR responds and produces a negative pulse which is transmitted by wire 2aw and a condenser 59a to point 67a of C2, turning it on.

With C2 on, its pentode 95a produces a negative pulse in response to a positive pulse from wire 97. The negative pulse is transferred to the resistor 5a in the associated network. Tube 2a inverts the negative pulse to a positive pulse upon the suppressors of 2aF and 2aR. Only 2aR responds and produces a negative pulse which is fed by wire 3aw and a condenser 59a to point 67a of C3, turning it on.

With C3 on, its pentode 95a, in response to a positive pulse from line 97, applies a negative pulse to the resistor 5a of the network containing tube 3a. Tube 3a inverts the pulse and the resulting negative pulse is applied to the suppressors of 3aF and 3aR. Only 3aR responds and produces a negative pulse which is transmitted by wire 1bw and a condenser 59b to point 67b of C1, turning it off.

It has been shown that each of the stages except the last in the reverse sequence, when turned on has controlled the following stage in this sequence to be turned on, but the last stage C3 in the reverse sequence, when turned on has controlled the first stage C1 in the sequence to be turned off.

The advance of the off and on conditions in stages C1, C2, and C3 during the reverse sequence is indicated in Fig. 2. The control by the branches of one stage over the branches of a next stage is as explained for the forward sequence, but it is understood that the first stage in the reverse sequence is the last in the forward sequence and the first in the forward sequence is the last in the reverse sequence. Further, it is understood that the stage which follows another in the forward sequence is the one which precedes it in the reverse sequence.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic commutator or the like comprising a chain of electronic trigger circuits, each including electron tube means providing two parallel space current paths and also including retroactive coupling between said paths such that high and low current conditions co-exist in the respective paths and mutually sustain each other to establish one static status of the circuit until tripping potential applied to the circuit reacts through said retroactive coupling upon said paths to reverse their current conditions and thereby establish an alternative static status of the circuit, each circuit further including in the tube means a supplemental space current path disconnected from the retroactive coupling so as to be devoid of effect on the status of the circuit and having a common portion with one of the first mentioned space current paths and so conditioned by said common portion as to be capable of functioning as a pulse gate only while the circuit remains in a particular one of said static states whereby an output pulse is produced by any supplemental path conditioned to function as a pulse gate, upon application thereto of an input pulse, means for applying input pulses to the supplemental paths of the chain of circuits, and means coupling the circuits and reacting to such output pulse of the supplemental path in one circuit for applying said tripping potential to a next circuit in the chain to reverse the status of said next circuit.

2. An electronic commutator or the like such as defined in claim 1, said coupling means for the chain of circuits including two sets of elements alternatively effective for applying tripping potential to the circuits in response to the output pulses of the supplemental space current paths, one set of elements coupling each circuit to the next circuit in a forward direction through the chain and the other set of elements coupling each circuit to the next in a reverse direction through the chain, whereby said circuits may be successively reversed in status either in a forward or a reverse direction, and direction control means for selectively rendering one or the other set of elements effective so as to determine the direction of operation of the circuits in the chain.

3. An electronic commutator or the like comprising a chain of electronic trigger circuits, each including electron tube means with two parallel space current paths and also including retroactive coupling between said paths such that relatively high and low current conditions co-exist and mutually sustain each other in the respective paths so as to establish one static status of the circuit or an alternative static status depending on which of the two current paths is in high and which in low current condition, each trigger circuit being reversible from either static status to the other in response to tripping potential reacting upon said paths with the aid of the retroactive coupling between them, each trigger circuit further including in its tube means a supplemental space current path disconnected from the retroactive coupling in the same trigger circuit so as to be devoid of effect on the status of the circuit, said supplemental space current path in each circuit having a portion common with one of the other space current paths in the circuit and so conditioned thereby as to function as a pulse gate in only one particular static status of the circuit, whereby an input pulse applied to said supplemental paths is passed through only by those supplemental paths conditioned to function as pulse gates, common means for simultaneously applying input pulses to the supplemental paths of the chain of trigger circuits, and means coupling the supplemental path in each circuit to the next circuit in the chain and reacting to the pulse passed by the supplemental path in one circuit to apply tripping potential to the next circuit to reverse this next circuit from its other status to said particular status, whereby said circuits are successively switched to said particular status.

4. An electronic commutator or the like including a plurality of electronic trigger circuits, each circuit including a pair of parallel, variable impedance networks and retroactive coupling between said networks such that relative high and low impedance conditions co-exist and mutually sustain each other in the networks to establish one static status or an alternative static status of the circuit depending on which network is in high impedance condition, each circuit further including a pair of electronic discharge pulse gates one of which is open only in one status of the circuit and the other of which is open only in the other status of the circuit, means for applying pulses to the pulse gates to be passed through the open gates, and coupling means intermediate the pulse gates of each circuit and the impedance networks of the next circuit for reacting to the pulse emitted by the gate open in one status of the preceding circuit to trigger the next circuit from one status to the other and reacting to the pulse emitted by the gate open in the other status of said preceding circuit to trigger said next circuit back to its former status.

5. An electronic commutator or the like comprising a ring of electronic trigger circuits to which pulses are to be applied, each trigger circuit having one static status or an alternative static status and including a pair of electronic discharge elements for translating pulses applied to the trigger circuit and selectively effective according to the status of the circuit, and coupling circuits between each circuit and the next and between the last and first circuit for responding to the pulses translated by said elements to trigger the ring of circuits first to one same status and thereafter to the same alternative status, and so on in cyclic manner.

6. An electronic commutator or the like such as defined in claim 5, said coupling circuits including two sets of alternatively effective connections, of which one set when effective couples the circuits for operation to the same status in one direction through the ring, and of which the other set when effective couples the circuits for operation to the same status in a reverse direction through the ring, and means for selectively rendering the sets of connections effective.

7. An electronic commutator or the like comprising successive electronic trigger circuits, each including a pair of variable impedance networks and retroactive coupling between said networks to establish one static status of the circuit in which one of the impedance networks is at high impedance and sustaining the other network at low impedance until tripping potential applied to the circuit reverses the impedance relation of the networks to establish an alternative static status of the circuit, each circuit further including a pair of electronic discharge pulse gates controlled by the impedance networks to be selectively effective according to the status of the circuit, and coupling means for the circuits including portions responsive to pulses passed through sequentially by corresponding pulse gates in the successive circuits for applying tripping potential to the circuits to trip them sequentially to the same status until the last circuit has been tripped to this status, said coupling means including another portion responsive to the pulse passed by said corresponding gate of the last circuit for applying tripping potential to the first circuit to trip it back to its former status, and the coupling means further including other portions thereafter responsive to pulses passed through sequentially by the other pulse gates in the successive circuits for applying potential to the second and following circuits to trip them sequentially back to their former status until the last circuit has been tripped back to its former status, and so on in repetitive manner whereby the circuits are all tripped sequentially to the same status and thereafter all tripped back to their former status.

8. An electronic commutator or the like such as defined in claim 7, said coupling means having two sets of coupling portions, one set effective to cause operation of the circuits in a forward direction and the other set effective to cause operation of the circuits in a reverse direction, and means for rendering one or the other set effective depending on the direction of operation to be effected.

9. An electrical system comprising a plurality of electronic trigger devices, each having alternative on and off states, and each embracing a pulse gate open in the on state of the device so as to pass an applied pulse and closed in the off state of the device so as to block the applied pulse, means for applying potential to a first device to trip it to on state so as to open its gate, means transmitting the effect of a pulse passed by the open gate on this first device to a second device to trip the second device to on state and open its gate, means transmitting the effect of a pulse passed by the open gate in the second device to a third device to trip it on and open its gate, and so on whereby a succession of the devices are sequentially tripped on to sequentially open their gates, and means for concurrently applying pulses to the gates of the plurality of devices to be passed through sequentially by the sequentially opened gates.

10. An electrical system comprising a series of pulse gates, each having an open condition to pass an applied pulse and an alternative, closed condition to block the applied pulse, coupling means interconnecting each gate except the last in the series with the next following gate and responsive to a pulse passed by a gate to open the next following gate, said coupling means permitting a gate when once opened to remain open, a circuit coupling the last gate to the first gate in the series and including an electronic tube responsive to a pulse passed by said last gate to effect closing of said first gate, and additional means connected to said gates for opening the first gate and closing all of the other gates in the series.

ARTHUR H. DICKINSON.

REFERENCES CITED

The following references are of record in the file of this patent:

UNITED STATES PATENTS

| Number | Name | Date |
|---|---|---|
| 2,158,285 | Koch | May 16, 1939 |
| 2,189,317 | Koch | Feb. 6, 1940 |

FOREIGN PATENTS

| Number | Country | Date |
|---|---|---|
| 510,216 | Great Britain | July 28, 1939 |

OTHER REFERENCES

Electronics, August 1939, "Trigger Circuits," by Reich, pages 14–17. (Copy in Division 10.)